US007970539B2

(12) United States Patent
Lee

(10) Patent No.: US 7,970,539 B2
(45) Date of Patent: Jun. 28, 2011

(54) METHOD OF DIRECTION-GUIDANCE USING 3D SOUND AND NAVIGATION SYSTEM USING THE METHOD

(75) Inventor: Hyun-chul Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1001 days.

(21) Appl. No.: 11/831,242

(22) Filed: Jul. 31, 2007

(65) Prior Publication Data

US 2008/0215239 A1    Sep. 4, 2008

(30) Foreign Application Priority Data

Mar. 2, 2007  (KR) ........................ 10-2007-0021147

(51) Int. Cl.
*H04R 5/00* (2006.01)
*G01C 21/26* (2006.01)

(52) U.S. Cl. ........ 701/211; 701/213; 381/17; 455/456.1

(58) Field of Classification Search ................ 701/211, 701/207, 213; 381/17; 455/456.1; 340/438, 340/384.1
See application file for complete search history.

(56) References Cited

U.S. PATENT DOCUMENTS

| 7,656,276 B2 * | 2/2010 | Takahashi et al. .......... 340/384.1 |
| 2003/0105586 A1 * | 6/2003 | Arai et al. ...................... 701/211 |
| 2006/0001532 A1 * | 1/2006 | Nagata .......................... 340/438 |

* cited by examiner

*Primary Examiner* — Tan Q Nguyen
(74) *Attorney, Agent, or Firm* — Sughrue Mion, PLLC

(57) ABSTRACT

Provided are a method of voice-guidance and a navigation system that guide a travel route of a mobile vehicle using a 3D sound having directivity. The method includes detecting at least one of a proceeding direction and a destination direction of a mobile vehicle base on navigation data, calculating a proceeding angle of the mobile vehicle and an angle of a destination direction based on at least one of the detected proceeding direction and the destination direction of the mobile vehicle, and generating a 3D direction-guidance sound of corresponding angle by providing the calculated angles to 3D sound technology.

18 Claims, 8 Drawing Sheets

METHOD OF DIRECTION-GUIDANCE USING 3D SOUND AND NAVIGATION SYSTEM USING THE METHOD

CROSS-REFERENCE TO RELATED PATENT APPLICATIONS

This application claims priority from Korean Patent Application No. 10-2007-0021147, filed on Mar. 2, 2007, in the Korean Intellectual Property Office, the disclosure of which is incorporated herein in its entirety by reference.

BACKGROUND OF THE INVENTION

1. Field of the Invention

Apparatuses and methods consistent with the present invention relate to a navigation system, and more particularly, to a method of direction-guidance processing that guides a vehicle along a travel route by using a 3D sound having directivity and a navigation system using the method.

2. Description of the Related Art

Conventionally, navigation systems detect the current location of a mobile vehicle, which is currently traveling, using navigation messages, which are transmitted by a plurality of satellites belonging to a global positioning system (GPS), a gyroscope, a speed sensor or the like, and match the detected current location of a mobile vehicle with map data, so as to display the current location of the mobile vehicle on a screen. In addition, navigation systems determine a travel route from the current location of the mobile vehicle or the starting point of the mobile vehicle to a predetermined destination using the map data, and guide the mobile vehicle along the determined travel route.

Navigation systems guide a mobile vehicle along a road using a combination of an image and a sound. However, a driver depends more on a voice-guidance function than an image-guidance function due to the danger of an accident that is likely to occur when viewing the image while driving. Voice-guidance of a conventional navigation system is output through a mono speaker having no directivity. However, a conventional guidance function may confuse a driver when a mobile vehicle proceeds in one of the directions illustrated in FIGS. 1A, 1B and 1C. A reference number 110 denotes a vehicle, and a reference number 120 denotes a proceeding direction of the vehicle 110.

Referring to FIG. 1A, when the vehicle 110 is intended to proceed in a 2:00 o'clock direction, the driver has difficulty in finding a correct proceeding direction of the vehicle 110 although he has heard a voice-guidance such as 'right-hand turn and '2:00 o'clock direction' at a five-way crossing, an intersection or the like.

When the driver hears continuous direction-guidance such as 'Drive to the right after right-hand turn or the like at a five-way crossing or an intersection, he or she has difficulty in finding a correct proceeding direction for the vehicle 110.

When the driver hears voice-guidance such as 'right-hand turn ahead 300 meters', he or she has difficulty in selecting a point at which to carry out the instruction, i.e., a reacting point.

Referring to FIG. 1B, although the driver hears voice guidance instructing to carry out a change in direction such as 'right-hand turn' after a while, he or she may have difficulty in finding a correct traveling direction when there is at least one alley ahead, where the vehicle can turn right.

Referring to FIG. 1C, the driver is confused when he has to change direction, and then immediately has to change direction again.

Accordingly, a driver who uses a conventional navigation system has to see a map in order to decide a correct traveling direction. However, the likelihood of an accident is increased when the driver cannot concentrate during driving.

SUMMARY OF THE INVENTION

Exemplary embodiments of the present invention provide a method of direction-guidance processing that guides a vehicle along a travel route by using a 3D sound having directivity.

The present invention also provides a navigation system that performs direction-guidance using a 3D sound having directivity.

According to an aspect of the present invention, there is provided a method of direction-guidance of a navigation system including detecting at least one of a proceeding direction and a destination direction of a mobile vehicle based on navigation data; calculating a proceeding angle of the mobile vehicle and an angle of a destination direction based on at least one of the detected proceeding direction and the destination direction of the mobile vehicle; and generating a 3D direction-guidance sound of a corresponding angle by providing the calculated angles to 3D sound technology.

According to another aspect of the present invention, there is provided an apparatus for 3D guidance voice processing of a navigation system including a direction measuring unit which measures at least one of a proceeding direction and a destination direction of a mobile vehicle based navigation data; a sound angle setting unit which calculates a proceeding angle of the mobile vehicle or an angle of a destination direction according to the proceeding direction or the destination direction of the mobile vehicle measured by the direction measuring unit, and sets the proceeding angle of the mobile vehicle or the angle of the destination direction as a sound angle with respect to a corresponding direction; and a 3D sound generating unit which generates a 3D guidance sound of a corresponding angle by providing at least one of the angle of the proceeding direction and the angle of the destination direction set by the sound angle setting unit to 3D sound technology.

BRIEF DESCRIPTION OF THE DRAWINGS

The above and other exemplary aspects and advantages of the present invention will become more apparent by the following detailed description of exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art.

Figure 1A:
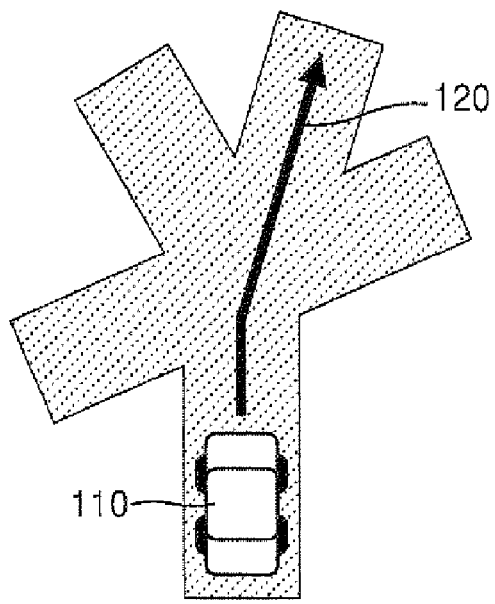
FIGS. 1A through 1C are views illustrating a conventional case in which a driver is confused.
Figure 1B:
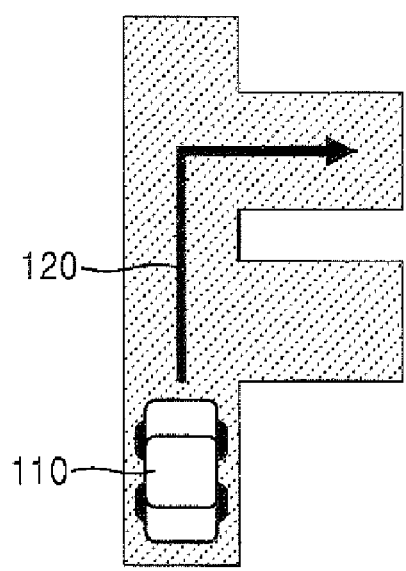
Figure 1C:
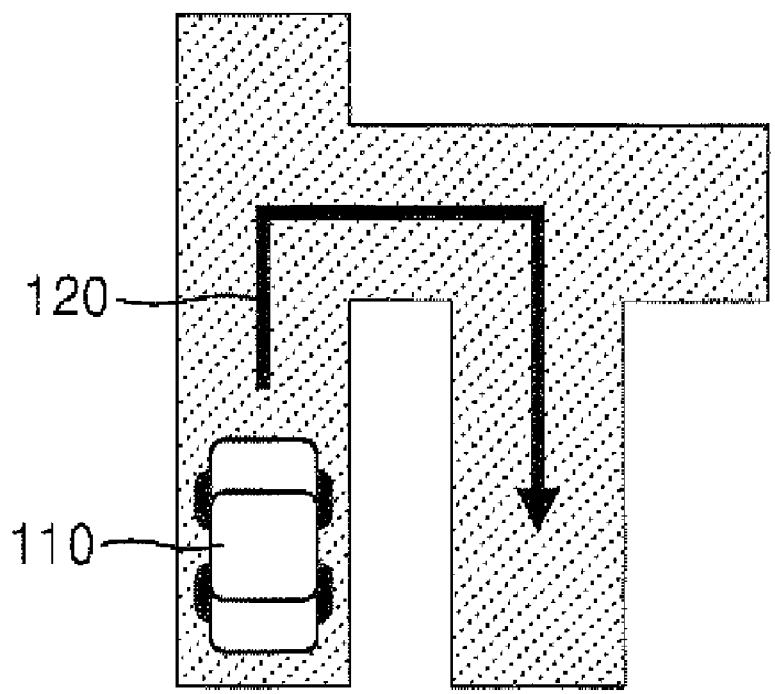
Figure 2:
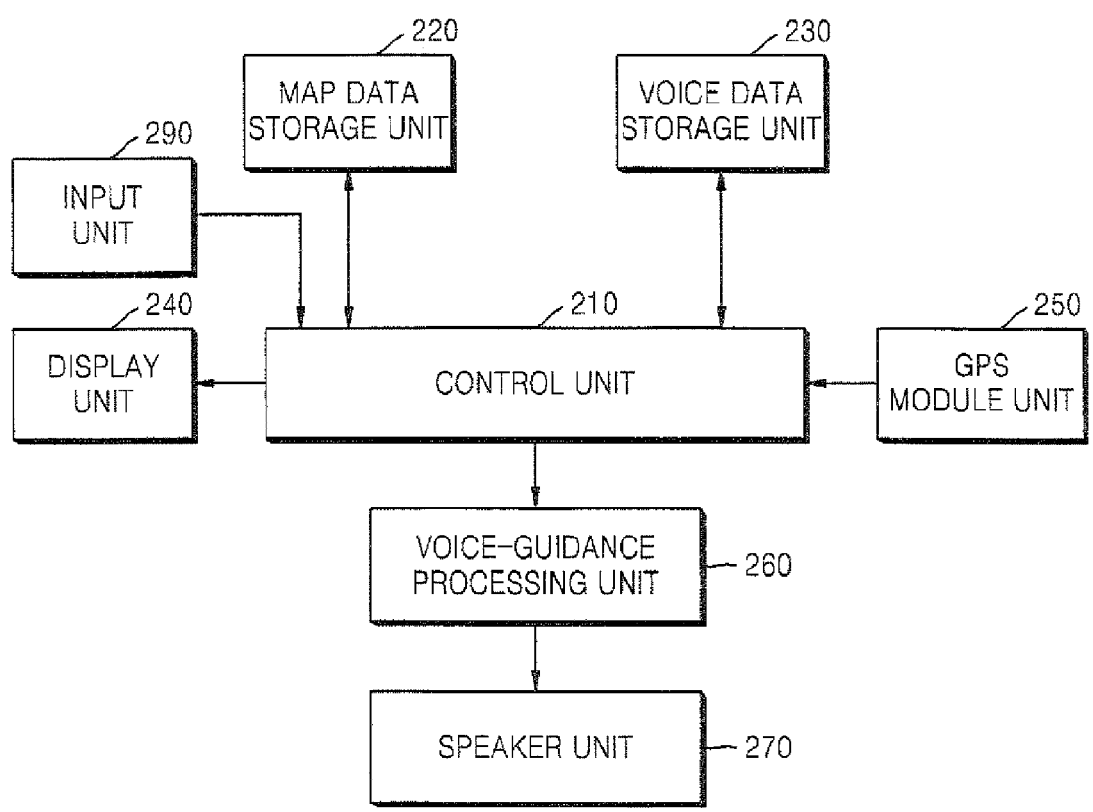
FIG. 2 is a block diagram illustrating a navigation system according to an embodiment of the present invention.

FIG. 2 is a block diagram illustrating a navigation system according to an embodiment of the present invention.

Referring to FIG. 2, the navigation system includes a control unit 210, a map data storage unit 220, a voice data storage unit 230, a displaying unit 240, a GPS module unit 250, a voice-guidance processing unit 260 and a speaker unit 270.

The GPS module unit 250 receives location information from a plurality of GPS satellites, and calculates a current location based on the location information. In addition, the GPS 250 module unit 250 measures a current proceeding direction using a gyro sensor.

The map data storage unit 220 stores map data.

The control unit 210 detects the current location of a mobile vehicle based on the current location and direction that is input by the GPS module unit 250, matches the detected current location of the mobile vehicle with the map data stored in the map data storage unit 220, and then determines a travel route of the mobile vehicle. The control unit 210 performs a guiding operation of the determined travel route, and transmits voice data stored in the voice data storage unit 230 to the voice-guidance processing unit 260.

An input unit 290 generates an operating order according to a user's input into the control unit 210.

The displaying unit 240 displays map data, a current location of the mobile vehicle, a travel route of the mobile vehicle or the like on a screen according to control by the control unit 210.

The voice data storage unit 230 stores voice data that is related to travel-route guidance performed by the control unit 210.

The voice-guidance processing unit 260 measures the proceeding direction and the destination direction of the mobile vehicle using the current location of the mobile vehicle and the travel-route guidance function that are processed by the control unit 210, sets a sound angle according to the proceeding direction and the destination direction of the mobile vehicle, and converts the voice data stored in the voice data storage unit 230, based on the set sound angle, into a 3D sound having directivity.

The speaker unit 270 reproduces a sound from a voice signal generated by the voice-guidance processing unit 260. The speaker unit 270 may include one of a stereo type navigation speaker, a stereo type vehicle speaker and a headphone/earphone.

Figure 3:
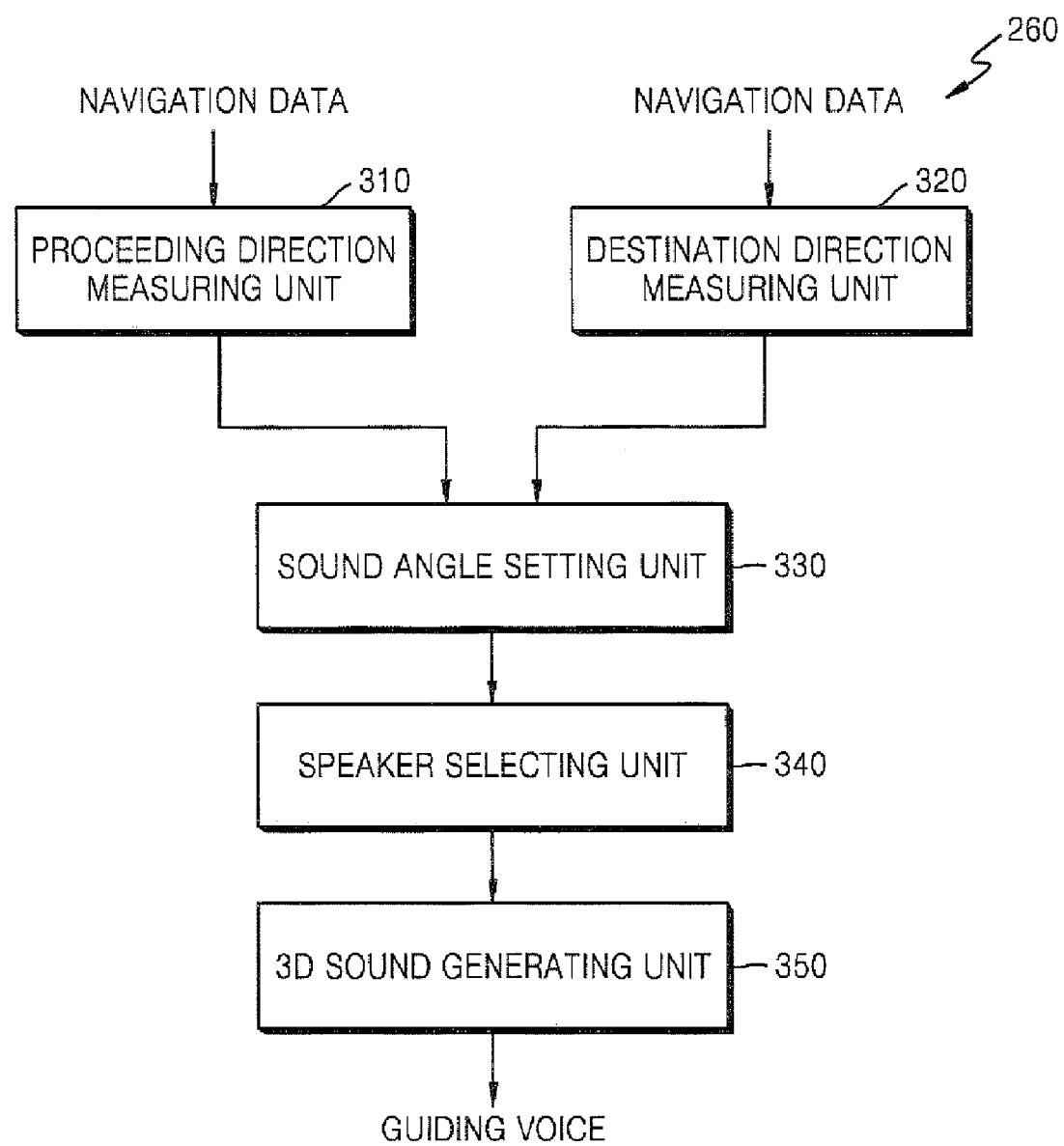
FIG. 3 is a detailed view illustrating a voice-guidance processing unit illustrated in FIG. 2.

FIG. 3 is a detailed view illustrating the voice-guidance processing unit 260 illustrated in FIG. 2.

The voice-guidance processing unit 260 includes a proceeding direction measuring unit 310, a destination direction measuring unit 320, a sound angle setting unit 330, a speaker selecting unit 340 and a 3D sound generating unit 350. The proceeding direction measuring unit 310 and the destination direction measuring unit 320 may be integrated as a direction measuring unit.

The proceeding direction measuring unit 310 measures an angle of the proceeding direction of the mobile vehicle, that is an angle between the proceeding direction of the mobile vehicle and a travel-route guidance direction and a remaining distance between the current location of the mobile vehicle and a changing point of direction (or a turning point) using the current location of the mobile vehicle and the travel-route guidance operation, and measures a turning angle of a road on which a vehicle is to turn.

The destination direction measuring unit 320 measures a straight line distance between the current location of the mobile vehicle and a destination using the current location of the mobile vehicle and the travel-route guidance operation.

The sound angle setting unit 330 calculates a proceeding direction angle using the remaining distance between the current location of the mobile vehicle and the changing point of direction and the turning angle of the road, which are measured by the proceeding direction measuring unit 310. In addition, the sound angle setting unit 330 calculates an angle of the destination direction using an angle difference between the current location of the mobile vehicle and the destination direction, which are measured by the destination direction measuring unit 320, and sets the angle of the proceeding direction and the angle of the destination direction as a sound angle of each direction.

The speaker selecting unit 340 selects whether a navigation speaker is to be used or a vehicle speaker.

The 3D sound generating unit 350 generates a 3D guiding sound corresponding to the sound angles of the proceeding direction and the destination direction, which are set by the sound angle setting unit 330, using an acoustics transfer function such as a head related transfer function (HRTF).

Figure 4:
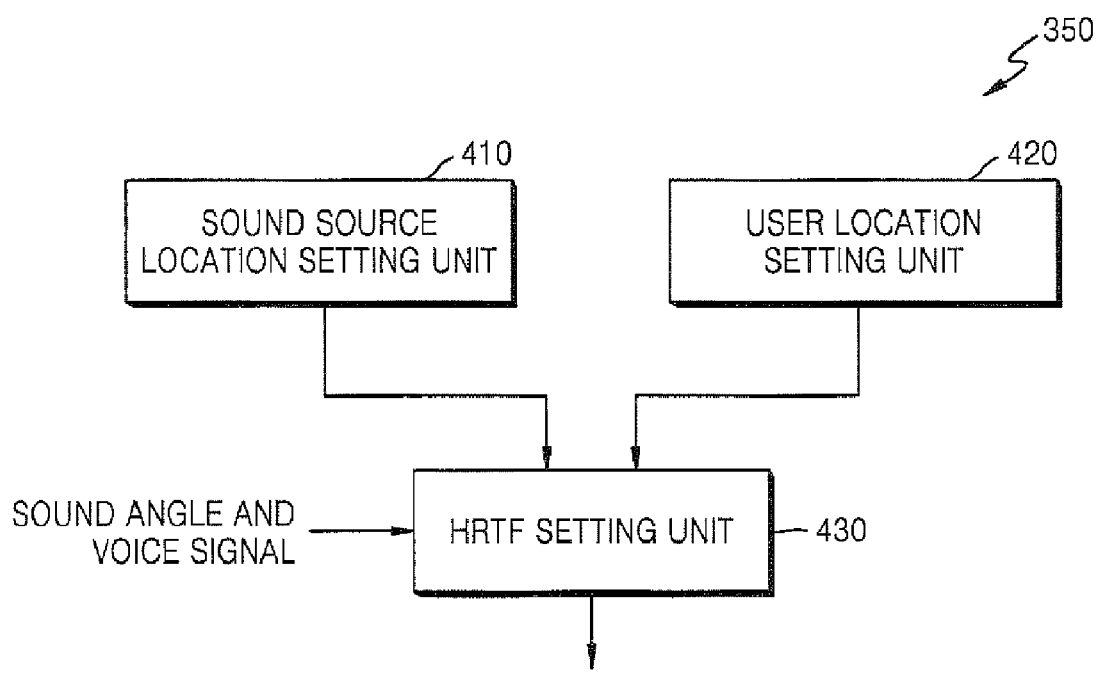
FIG. 4 is a detailed view illustrating a 3D sound generating unit illustrated in FIG. 3.

FIG. 4 is a detailed view illustrating the 3D sound generating unit 350 illustrated in FIG. 3.

Generally, a 3D sound system forms a sound source at a predetermined location of a virtual space by using a headphone or a speaker to generate a sense of locality, distance and space so that a user may hear a sound as if the sound were emanating from the virtual sound source just like an actual sound occurrence. Generally, a 3D sound is embodied using an HRTF that is an acoustics transfer function between a sound source and the eardrum. The HRTF provides various sound images in a 3D space by using two speakers. The HRTF includes a lot of information that represents properties of a space to which a sound is transferred as well as a time difference between the two ears, a level difference between the two ears and the shape of the outer ear. In particular, the HRTF includes information about the outer ear that decisively influences the upper and lower sound image localization. However, since it is difficult to perform modeling using the outer ear due to their complex shape, the HRTF is measured at various angles using dummy heads.

Referring back to FIG. 4, a sound source location setting unit 410 sets the location of a stereo type vehicle speaker, a stereo type navigation speaker or a headphone/earphone.

A user location setting unit 420 sets the location of a user who drives a mobile vehicle.

An HRTF setting unit 430 selects an HRTF corresponding to sound angles representing the locations of the sound source and the driver that are respectively set by the sound source location setting unit 410 and the user location setting unit 420. Then, the HRTF setting unit 430 performs convolution with respect to the HRTF and an audio signal in order to generate 3D voice signals or 3D tone signal having corresponding angles. At this time, HRTFs measured in the range of 0° to 360° are stored in a table according to the locations of the sound source and the driver. For example, when the sound angle is 20°, an HRTF of 20° is selected. A voice-guidance signal or a tone signal is localized as a direction of 20° after being processed according to the HRTF of 20°. Accordingly, the HRTF setting unit 430 generates a 3D sound having directivity from a voice signal or a tone signal, which is used by the current proceeding direction so as to be guided according to the set sound angle.

The HRTF generates a 3D sound by conventional means, and thus a detailed description thereof will be omitted.

Figure 5:
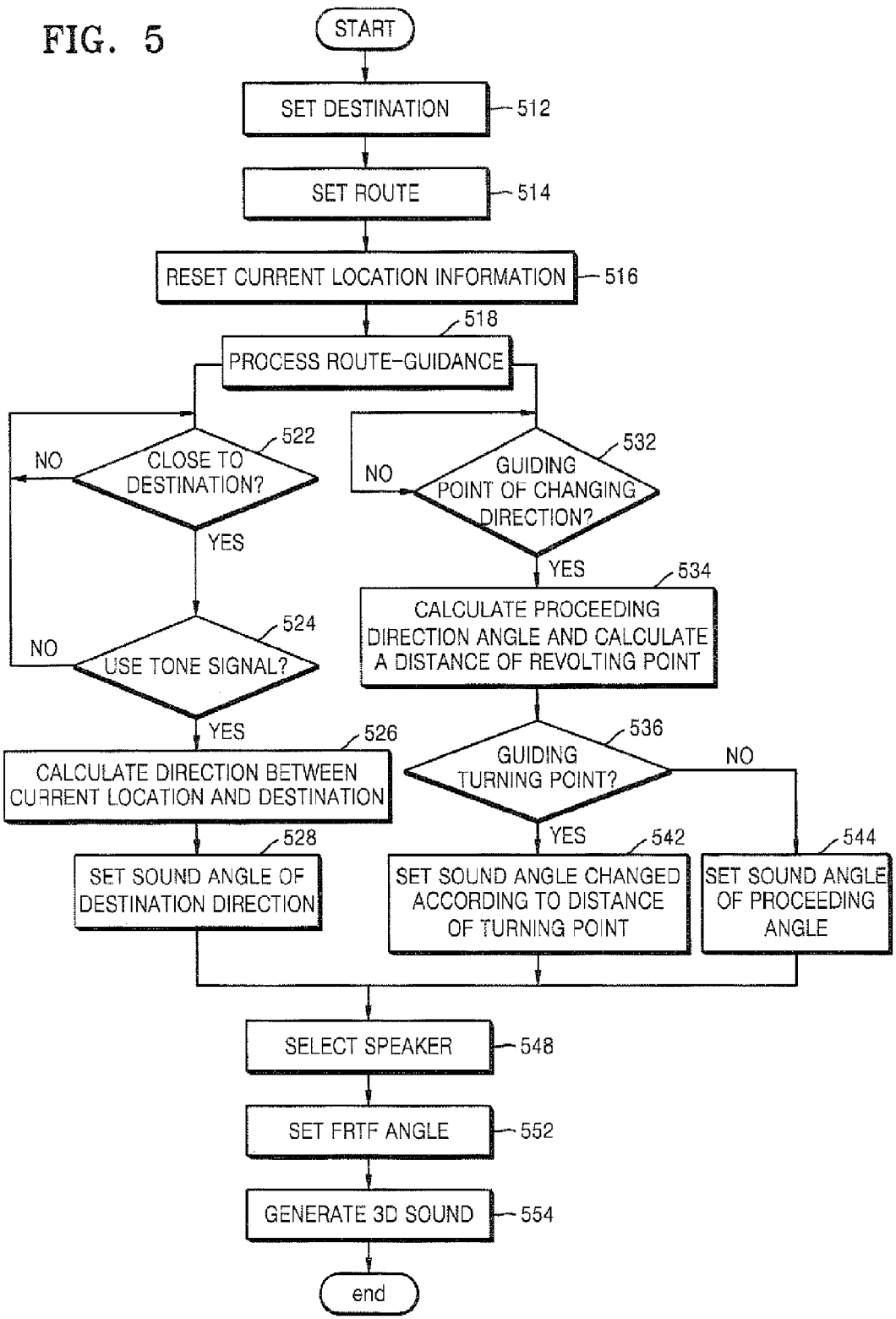
FIG. 5 is a flowchart illustrating a method of direction-guidance of a navigation system, according to an embodiment of the present invention.

FIG. 5 is a flowchart illustrating a method of direction-guidance of a navigation system, according to an embodiment of the present invention.

Referring to FIG. 5, a starting point and a destination are set by a user (operation S512).

Next, a travel route of a mobile vehicle between the starting point and the destination is set using stored map data (operation S514).

Current location information is updated using a GPS signal (operation S516).

A distance between the starting point and the destination is calculated using the GPS signal and the map data, and path-guidance information is processed based on information on an intersection, a three-way crossing or a five-way crossing (operation S518).

Next, sound angles are calculated by dividing a route into a destination direction and a proceeding direction based on route-guidance information.

An operation of calculating the sound angle of the destination direction will now be described.

First, it is determined whether a mobile vehicle is close to a destination using the GPS signals and the map data based on the remaining distance between the current location of the mobile vehicle and the destination (operation S522).

When the mobile vehicle is close to the destination, it is checked whether a tone signal will be used for direction-guidance to the destination (operation S524).

The angle of the destination direction is calculated using the angle difference between a straight line direction from a current location of a mobile vehicle to a destination and a proceeding direction of the mobile vehicle by referring to map data (operation S528).

As an example, the angle θ of the destination direction is set as given by the following Equation 1.

$$\theta = \tan^{-1}(dy/dx) \quad \text{Equation 1}$$

where dy is a variation of y coordinates of the destination with respect to the current location, and dx is a variation of x coordinates of the destination with respect to the current location.

Figure 6:
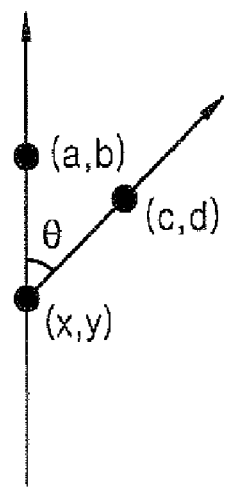
FIG. 6 is a view illustrating calculation of a sound angle used in the method illustrated in FIG. 5.

As another example, the angle θ of the destination direction is obtained using the manner in which vectors of the current proceeding direction of the mobile vehicle and the destination direction are obtained using latitude and longitude coordinates, and an angle between the two vectors is obtained using the inner product of the two vectors, as illustrated in FIG. 6. Equation 2 is an equation by which the angle θ of the destination direction is calculated.

$$\vec{a} = (a-x, b-y), \vec{b} = (c-x, d-y), \theta = a\cos\frac{\vec{a} \times \vec{b}}{|\vec{a}| \times |\vec{b}|} \quad \text{Equation 2}$$

where (x, y) is the coordinates of the current location of the mobile vehicle, (a, b) is the coordinates of the location after proceeding towards the current proceeding direction by a predetermined distance from the current location of the mobile vehicle, and (c, d) is the coordinates of the location after proceeding towards the destination direction by a predetermined distance from the current location of the mobile vehicle.

An operation of calculating of the sound angle of the proceeding direction will now be described.

First, it is determined whether it is time to change direction using map data (operation S532). When it is time to change direction, the angle of the proceeding direction is calculated, and the distance between the current location of the mobile vehicle and the turning point is also calculated (operation S534).

Next, it is determined whether guidance with respect to the turning point will be performed (operation S534).

When it is determined that guidance with respect to the turning point will be performed, a plurality of the angles of the proceeding directions that are gradually changed are calculated according to the distance between the current location of the mobile vehicle and the turning point (operation S542). For example, the distance between the current location of the mobile vehicle and the turning point is each classified into 1 km, 500 m and 300 m, the angles of the proceeding directions corresponding to the classified distances are respectively calculated in terms of 30°, 60° and 90°, and the calculated angles of the proceeding directions are respectively set as variable sound angles. However, when it is determined that guidance with respect to the turning point will not be performed, the angle of the proceeding direction of the mobile vehicle, which has been already calculated, is set as the sound angle (operation S544).

As an example, the angle θ of the proceeding direction is set as given by the following Equation 3.

$$\theta = \tan^{-1}(dy/dx) \quad \text{Equation 3}$$

where dy is a variation of y coordinates of the proceeding direction with respect to the current location, and dx is a variation of x coordinates of the proceeding direction with respect to the current location.

As another example, the angle θ of the proceeding direction is obtained using the manner in which vectors of the current proceeding direction of the mobile vehicle and a guided direction are obtained using latitude and longitude coordinates, and an angle between the two vectors is obtained using the inner product of the two vectors, as illustrated in FIG. 6. Equation 4 is an equation by which the angle θ of the proceeding direction is calculated.

$$\vec{a} = (a-x, b-y), \vec{b} = (c-x, d-y), \theta = a\cos\frac{\vec{a} \times \vec{b}}{|\vec{a}| \times |\vec{b}|} \quad \text{Equation 4}$$

where (x, y) is coordinates of the current location of the mobile vehicle, and (a, b) is the coordinates of the location after proceeding towards the current proceeding direction by a predetermined distance from the current location of the mobile vehicle, and (c, d) is the coordinates of the location after proceeding by a predetermined distance from the changing direction of direction of the mobile vehicle.

Next, the sound angles of the destination direction and the proceeding direction are calculated, and then the type of speaker, through which a voice-guidance signal is output, is selected (operation S548). For example, a 3D sound can be output through one of a stereo type navigation speaker, a stereo type vehicle speaker or a headphone/earphone.

The HRTF angle is set using the sound angle of the calculated destination direction and the proceeding direction (operation S552).

In the case of proceeding direction-guidance, voice data stored in a voice data storage unit is converted into a 3D voice according to an HRTF of a predetermined angle. In the case of destination direction-guidance, a tone signal having a predetermined pattern is converted into a 3D voice according to an HRTF of a predetermined angle (operation S554).

At this time, when a stereo type speaker that is installed in a navigation system is used in the mobile vehicle, since locations of a sound source and a driver are fixed, the navigation system provides a 3D sound having directivity to the driver using 3D sound technologies such as HRTF or the like.

As another example, when a vehicle speaker is used in the mobile vehicle, the navigation system can provide a 3D sound by controlling sound levels of speakers at front left, front right, rear left and rear right sides.

Figure 7A:
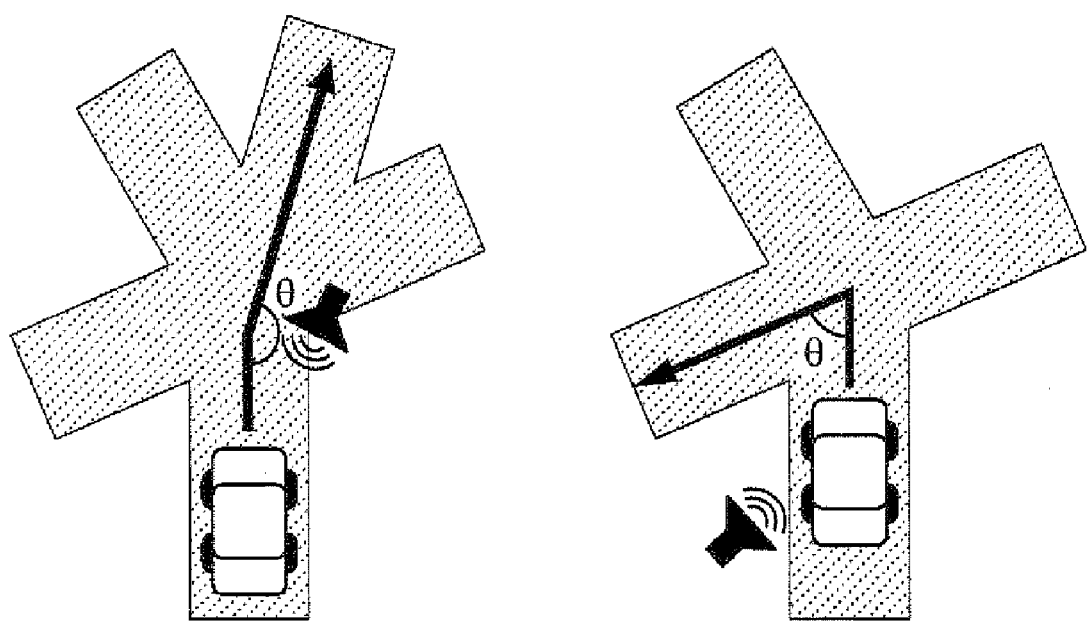
FIGS. 7A through 7C are views illustrating proceeding direction-guidance of a mobile vehicle, according to an embodiment of the present invention.

FIG. 7A is a view illustrating voice-guidance processing of a proceeding direction, according to an embodiment of the present invention.

Referring to FIG. 7A, in the case of proceeding direction-guidance, a sound angle θ is set according to the proceeding direction (indicated by an arrow). Accordingly, when the mobile vehicle proceeds, a 3D sound having directivity according to the sound angle θ is formed. Thus, since the 3D sound can provide a direction having an angle in the range of 0 to 360°, a driver can easily find a road when he or she drives in a direction indicated by the voice guidance.

Figure 7B:
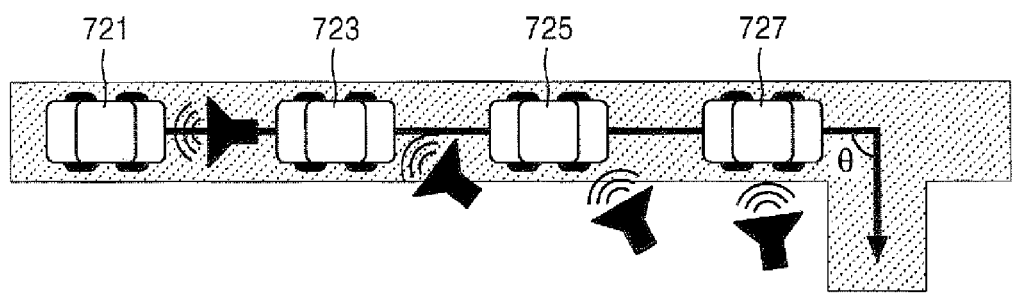

FIG. 7B is a view illustrating voice-guidance processing of a changing point of direction, according to an embodiment of the present invention.

Referring to FIG. 7B, a plurality of sound angles, which are gradually changed according to a distance between the current location of the mobile vehicle and a turning point, are set. For example, a proceeding angle of the changing point of direction is θ. Then, when a mobile vehicle is currently before the turning point by 1 km, distances between the current location of the mobile vehicle and the turning point are each classified into 1 km, 500 m, 300 m and 0 m distances, and sound angles corresponding to the classified distances are each set as '0°+(θ×0.1)', '0°+(θ×0.4)', '0°+(θ×0.7)' and '0°+(θ×1)'. At this time, the sound angle is obtained by using Equation 3 or 4. A 3D sound having directivity is formed according to each sound angle θ. Accordingly, when the mobile vehicle changes direction, the driver of the mobile vehicle can hear a 3D guidance voice having directivity according to the sound angles θ that are changed at locations 721, 723, 725 and 727 corresponding to each of the classified distances.

Figure 7C:
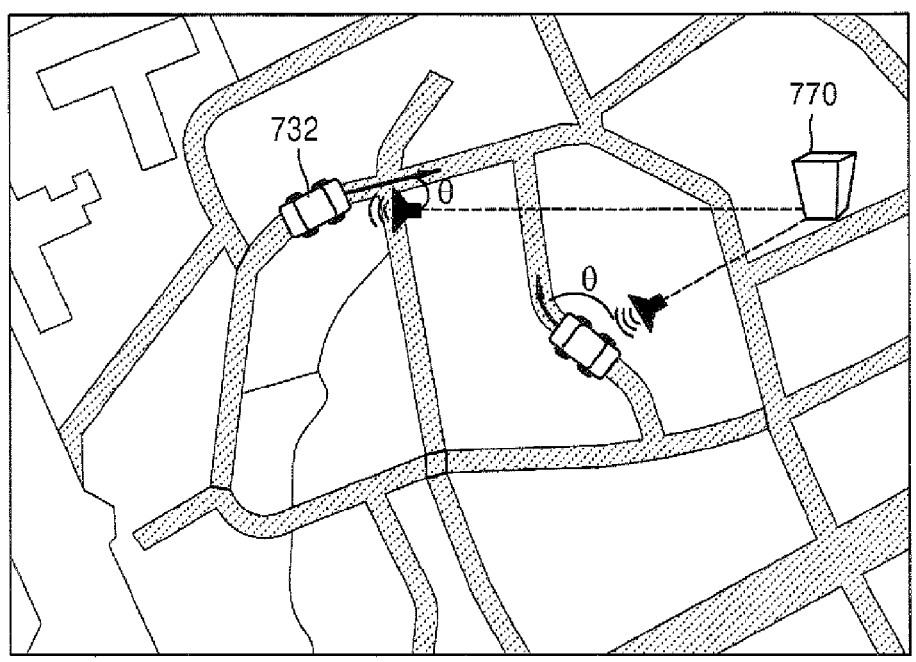

FIG. 7C is a view illustrating voice-guidance processing of the destination direction, according to an embodiment of the present invention.

Referring to FIG. 7C, the sound angle of the destination is set using an angle difference θ between a straight line direction from the current location 732 and 736 of the mobile vehicle to a destination 770 and the current proceeding direction of the mobile vehicle. A 3D sound having directivity is formed according to the sound angle θ which changes when the mobile vehicle changes direction. Accordingly, when the changing point of direction is not correctly guided due to an error of a satellite signal, the driver can effectively find the destination using a guidance voice and a tone signal even when in an alley, where there may be a difficulty with satellite communication.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

According to the present invention as described above, a proceeding direction is easily selected by providing directivity to voice-guidance using 3D sound technologies such as HRTF, and simultaneously, the location of a destination can be more intuitively found using a tone signal having directivity. For example, although the mobile vehicle is continuously changing direction, the voice-guidance having directivity guides the driver along the correct roads. Since a direction in the range of 0 to 360° is easily found using a 3D sound, a driver can easily find a road if only he or she drives in a direction from which a guiding sound is heard. When it is difficult to select a reaction point due to traveling speed, it is difficult for a vehicle driver to suddenly react as soon as he or she hears a tone signal. Accordingly, the navigation system allows the driver to determine the reaction point by gradually changing the sound direction, and thus the driver can react at the correct time. In addition, in the case of driving in an alley, where there may be a difficulty with satellite communication, the changing point of direction may not be correctly guided due to an error of a satellite signal. If a guidance voice and a tone signal in the form of a guiding voice notify the driver about a direction change and a destination direction, a road can be effectively found even when driving in an alley.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of direction-guidance of a navigation system, the method comprising:
   detecting at least one of a proceeding direction in which a mobile vehicle is moving and a destination direction from a mobile vehicle to a destination based on navigation data;
   calculating a proceeding angle and an angle of a destination direction of a mobile vehicle based on at least one of the detected proceeding direction and the detected destination direction of the mobile vehicle; and
   generating a 3D direction-guidance sound having an angle corresponding to one of the proceeding angle and the angle of a destination direction using 3D sound technology.

2. The method of claim 1, further comprising:
   selecting a type of speaker for outputting a 3D sound direction-guidance voice according to the proceeding angle.

3. The method of claim 1, wherein the calculating of the angle of the destination direction comprises calculating an angle difference between a straight line direction from a current location of the mobile vehicle to the destination and a proceeding direction of the mobile vehicle by referring to map data.

4. The method of claim 1, wherein the calculating of the proceeding angle of the mobile vehicle comprises:
   calculating an angle of a current proceeding direction of the mobile vehicle referring to map data, and calculating a distance between a current location and a turning point of the mobile vehicle; and
   calculating a proceeding angle that changes according to a distance from the calculated location of the mobile vehicle to the turning point.

5. The method of claim 1, wherein the generating of the 3D direction-guidance sound comprises providing an input a tone signal and guiding voice to an acoustics transfer function of a predetermined angle, in which locations of a sound source and a driver are represented.

6. The method of claim 5, wherein the acoustics transfer function is a head related transfer function (HRTF).

7. The method of claim 3, wherein the calculating of the angle difference comprises calculating vectors of a current proceeding direction and a destination direction of the mobile vehicle using latitude and longitude coordinates received from a GPS (global positioning system), and setting an angle difference between the current proceeding direction and the destination direction by using an inner product of the two vectors.

8. The method of claim 4, wherein the calculating of the proceeding angle comprises calculating vectors of a current proceeding direction and a guided direction of the mobile vehicle using latitude and longitude coordinates received from the GPS, and setting an angle difference between the current proceeding direction and the destination direction using the inner product of the two vectors.

9. The method of claim 1, wherein the generating of the 3D direction-guidance sound comprises generating a tone signal having a predetermined pattern with respect to a corresponding angle by providing the angle of the destination direction to 3D sound technologies.

10. The method of claim 1, wherein the generating of the 3D direction-guidance sound comprises controlling output levels of a plurality of speakers according to a proceeding angle of the proceeding direction or the destination direction of the mobile vehicle.

11. An apparatus for 3D guidance voice processing of a navigation system, the apparatus comprising:
a direction measuring unit which measures at least one of a proceeding direction and a destination direction of a mobile vehicle based navigation data;
a sound angle setting unit which calculates a proceeding angle of the mobile vehicle or an angle of a destination direction of the mobile vehicle according to the proceeding direction or the destination direction of the mobile vehicle measured by the direction measuring unit, and which sets the proceeding angle of the mobile vehicle or the angle of the destination direction as a sound angle with respect to a corresponding direction; and
a 3D sound generating unit which generates a 3D guidance sound of a corresponding angle by providing at least one of the angle of the proceeding direction and the angle of the destination direction set by the sound angle setting unit to 3D sound technology.

12. The apparatus of claim 11, wherein the direction measuring unit comprises:
a proceeding direction measuring unit which measures an angle of a proceeding direction of the mobile vehicle and a distance between a current location and a changing point of direction of the mobile vehicle based on the current location of the mobile vehicle and a travel-route guidance signal; and
a destination direction measuring unit which measures a straight line direction from the current location of the mobile vehicle to a destination based on the current location of the mobile vehicle and the travel-route guidance signal.

13. The apparatus of claim 11, wherein the sound angle setting unit calculates a sound angle of a proceeding direction based on a distance between the current location and the changing point of direction and proceeding angles of the changing point of direction that are measured by the proceeding direction measuring unit, and sets a sound angle of the destination direction based on an angle difference between the current proceeding direction of the mobile vehicle and the destination direction that are measured by the destination direction measuring unit.

14. An apparatus of direction-guidance of a navigation system, the apparatus comprising:
a proceeding direction measuring unit which measures an angle of a proceeding direction of a mobile vehicle and a distance between a current location and a changing point of direction of the mobile vehicle based on a current location of the mobile vehicle and a travel-route guidance signal;
a destination direction measuring unit which measures a straight line direction from the current location of the mobile vehicle to a destination based on the current location of the mobile vehicle and the travel-route guidance operation;
a sound angle setting unit which calculates a sound angle of a proceeding direction based on a distance between the current location and the changing point of direction and proceeding angles of the changing point of direction that are measured by the proceeding direction measuring unit, and sets a sound angle of the destination direction based on an angle difference between the current proceeding direction of the mobile vehicle and the destination direction that are measured by the destination direction measuring unit; and
a 3D sound generating unit which generates a 3D guidance sound of a corresponding angle by providing at least one of the angle of the proceeding direction and the angle of the destination direction set by the sound angle setting unit to 3D sound technology.

15. The apparatus of claim 14, wherein the 3D sound generating unit comprises:
a sound source location setting unit which sets a location of a speaker;
a user location setting unit which sets a location of a user driving the mobile vehicle; and
an HRTF setting unit generating a 3D guiding sound of a corresponding angle by convolution of an audio signal with an HRTF of a corresponding angle, in which the location of the sound source set by the sound source location setting unit and the location of the user set by the user location setting unit are reflected.

16. A navigation system comprising:
a GPS module unit which receives location information from a plurality of GPS satellites, and calculates information on a current location of a mobile vehicle and a direction of travel of the mobile vehicle from the received location information;
a map data storage unit which stores map data;
a control unit which detects a current location of the mobile vehicle based on the information on the current location and the direction information input by the GPS module unit, matches the detected current location of the mobile vehicle with the map data stored in the map data storage unit, and determines a travel route for the mobile vehicle;
a voice data storage unit which stores voice data related to the travel-route determined by the controlling unit; and
a voice-guidance processing unit which measures a proceeding direction and a destination direction of the mobile vehicle using the current location of the mobile vehicle and the travel-route determined by the controlling unit, calculates a proceeding angle of the mobile vehicle according to the proceeding direction of the mobile vehicle and the destination direction of the mobile vehicle, and generates a 3D sound of a corresponding angle from the voice data stored in the voice data storage unit by providing the proceeding angle to 3D sound technology.

17. The navigation system of claim 16, wherein the voice-guidance processing unit comprises:
- a proceeding direction measuring unit which measures a proceeding angle of the mobile vehicle and a distance between a current location and a turning point of the mobile vehicle based on the current location of the mobile vehicle and the travel-route determined by the controlling unit;
- a destination direction measuring unit which measures a straight line direction from the current location of the mobile vehicle to a destination based on the current location of the mobile vehicle and the travel-route determined by the controlling unit;
- a sound angle setting unit which calculates a proceeding angle that changes according to a distance between the current location and the turning point of the mobile vehicle, which is measured by the proceeding direction measuring unit, calculates an angle of the destination direction using an angle difference between the current location of the mobile vehicle and the destination direction that are measured by the destination direction measuring unit, and sets the angles as sound angles of the proceeding direction and the destination direction;
- a 3D sound generating unit which generates a 3D guiding sound of a corresponding angle by providing information on the proceeding direction and the destination direction that is measured by the sound angle setting unit to 3D sound technology; and
- a speaker unit which reproduces a 3D sound generated by the 3D sound generating unit.

18. The navigation system of claim 17, wherein the 3D sound generating unit comprises a database in which there is an HRTF of a predetermined angle corresponding to the proceeding direction and the destination direction.

* * * * *